United States Patent

[11] 3,585,291

[72] Inventor Kiyoshi Yamakawa
Tokyo, Japan
[21] Appl. No. 760,203
[22] Filed Sept. 17, 1968
[45] Patented June 15, 1971
[73] Assignee Sony Corporation
Tokyo, Japan
[32] Priority Sept. 20, 1967
[33] Japan
[31] 42/60369

[54] MAGNETIC RECORDING AND REPRODUCING SYSTEM WITH TAPE-TO-HEAD SPEED CONTROL
10 Claims, 6 Drawing Figs.

[52] U.S. Cl. .................... 178/6.6, 179/100.2
[51] Int. Cl. .................... G11b 19/28, G11b 5/52, H04n 5/78
[50] Field of Search .................... 179/100.2 T; 178/6.6 A, 6.6 P

[56] References Cited
UNITED STATES PATENTS
2,876,295 3/1959 Irby .................... 179/100.2

*Primary Examiner*—Bernard Konick
*Assistant Examiner*—Steven B. Pokotilow
*Attorneys*—Albert C. Johnston, Robert E. Isner, Lewis H. Eslinger and Alvin Sinderbrand

ABSTRACT: In a magnetic recording and reproducing system in which at least one rotary magnetic head records signals on a magnetic tape in tracks that are skewed or obliquely arranged, the traces of each head are aligned with the recording tracks during playback or reproducing of the recorded signals by generating a reference signal in accordance with the rotational position of the rotary head or heads, envelope-detecting the output of the head or heads, comparing the phases of the envelope-detected output and the reference signal, and, on the basis of such comparison, adjusting the relative position of the tape to the rotary head or heads.

INVENTOR.

Kiyoshi Yamakawa

BY

ATTORNEYS

PATENTED JUN 15 1971 3,585,291

INVENTOR.

Kiyoshi Yamakawa

BY

ATTORNEYS

INVENTOR.
Kiyoshi Yamakawa
BY
ATTORNEYS

MAGNETIC RECORDING AND REPRODUCING SYSTEM WITH TAPE-TO-HEAD SPEED CONTROL

This invention relates to a magnetic recording and reproducing system of the type in which signals are recorded on a magnetic tape in tracks extending obliquely to the lengthwise direction of the tape by means of rotary magnetic heads, and more particularly to a video tape recording and reproducing system of the foregoing type.

In conventional magnetic recording and reproducing systems of the type having signals recorded on the magnetic tape in skewed or obliquely extending tracks, a servosystem is required for ensuring faithful scanning of the recorded magnetic tracks by playback heads and control signals are recorded on the tape in its lengthwise direction for this purpose. However, such control signals are recorded on the tape by a fixed head separately from the record signal tracks, so that an error is likely to be introduced in the positions of the control signals relative to the record signal tracks when employing different devices for the magnetic recording and reproducing of the signals, and this results in degradation of the replaceability of the tape in simple-structured magnetic recording and reproducing devices. Further, stretching of the tape leads to mistracking of the rotary magnetic head and, in addition, the control signals, being recorded on a marginal portion of the tape, do not permit formation of the record signal tracks over the entire width of the tape and so that the utilization of the tape for the record signals is reduced.

This invention is directed to the provision of a magnetic recording and reproducing system in which the record tracks themselves are made use of as the control signals so as to avoid the drawbacks described above, and by which it is possible to increase the utilization of the tape for the recorded signals and to achieve accurate tracking with simple structured devices.

It is an object of this invention to provide a magnetic recording and reproducing system which provides for enhanced replaceability of tapes.

It is another object of this invention to provide a magnetic recording and reproducing system for use with simple-structured devices.

It is still another object of this invention to provide a magnetic recording and reproducing system which provides a high utilization factor of the tape to increase the density with which signals may be recorded on the magnetic tape.

The above, and other objects, features and advantages of this invention, will become apparent from the following description of illustrative embodiments thereof which is to be read in conjunction with the accompanying drawings, in which.

Figure 1:
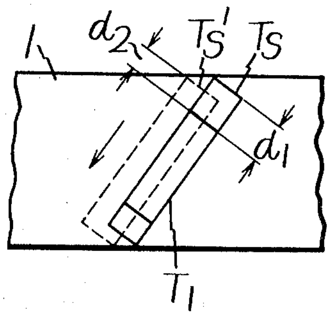
FIG. 1 is a fragmentary view of a length of magnetic tape schematically illustrating a magnetic track formed thereon for purposes of explanation of this invention.

In FIG. 1 there is illustrated a length of a magnetic tape 1 having formed thereon a magnetic track $T_1$ which has signals recorded therein and which is arranged obliquely to the lengthwise direction of the tape. When a rotary magnetic head faithfully traces the magnetic track $T_1$ as indicated by $T_s$, the distance $d_1$ between the start of the recorded signal in the track $T_1$ and the start of the scanning trace of the head is always constant. If, however, the rotary magnetic head does not exactly scan the magnetic track $T_1$ and its scanning trace $T_s$ is shifted to $T_s'$, as indicated by broken lines, the distance between the start of the recorded signal in track $T_1$ and the start of the scanning trace $T_s'$ becomes smaller than $d_1$, as indicated at $d_2$. When the scanning trace $T_s$ is shifted in the reverse direction relative to track $T_1$, the distance between the start of the scanning trace and the start of the recording in track $T_1$ exceeds $d_1$. The position of the start of the scanning trace is determined by a signal representative of the rotational position of the rotary magnetic head and the position at which the recorded signal starts in the magnetic track can be determined by envelope-detection of the reproduced signal. Therefore, accurate scanning of the magnetic track can be effected by phase comparison of the envelope-detected output with the signal representative of the rotational position of the rotary magnetic head and by adjusting the rotational speed of the head or the translational speed of the tape so as to hold the compared phases in a constant relationship at all times.

Figure 2:
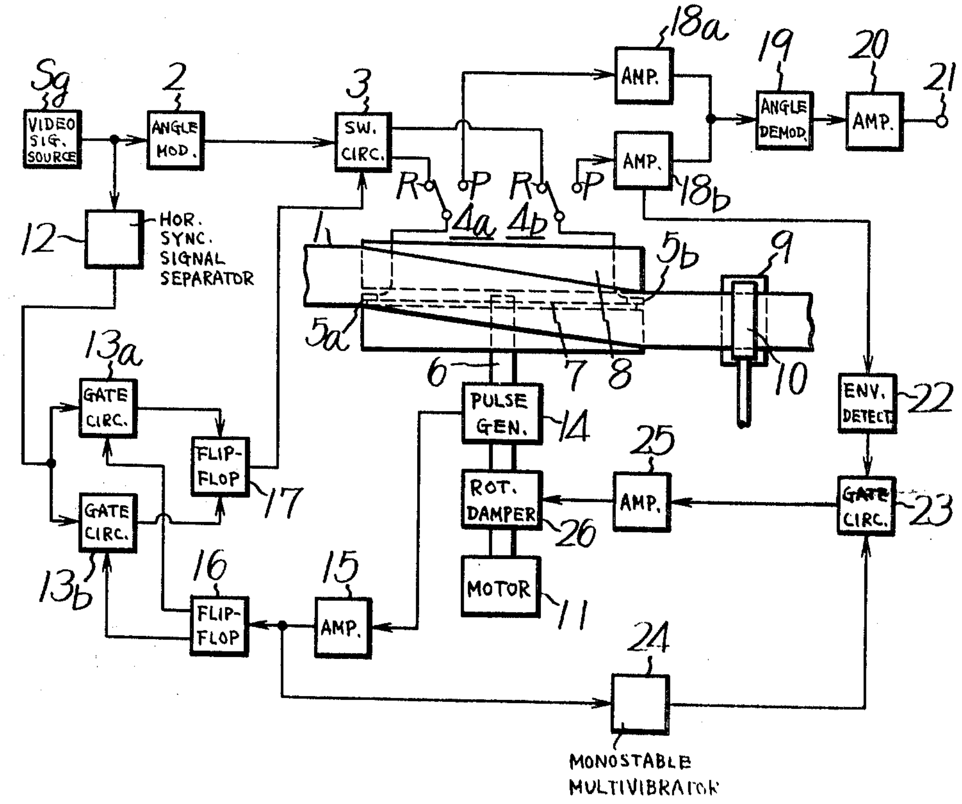
FIG. 2 is a block diagram of a magnetic recording and reproducing system according to one embodiment of this invention.

In the embodiment of this invention shown on FIG. 2, one field of a video signal is recorded by two rotary magnetic heads in six successive tracks on the tape. Thus, in the system of FIG. 2, the output of a video signal source *Sg* is applied to an angle modulator 2 and the angle-modulated signal emanating therefrom is fed to a switching circuit 3 by which the output of circuit 3 is alternately applied to rotary magnetic heads 5*a* and 5*b* through record contacts R of record and playback switches 4*a* and 4*b*. The rotary magnetic heads 5*a* and 5*b* are mounted on opposed ends of a support arm 7 affixed to a rotary shaft 6 and a cylindrical tape guide member 8 is provided adjacent the rotary magnetic heads so as to have its peripheral surface in agreement with the circular path in which the heads move in response to rotation of shaft 6. The magnetic tape 1 is guided in a manner to travel around a 180° or more portion of the peripheral surface of cylindrical tape guide member 8 obliquely to the plane of revolution of the rotary magnetic heads 5*a* and 5*b*. A capstan 9 and a pinch roller 10 are provided for effecting translational movement of the tape in the longitudinal direction of the latter and a motor 11 is provided for rotating the shaft 6.

Figure 3:
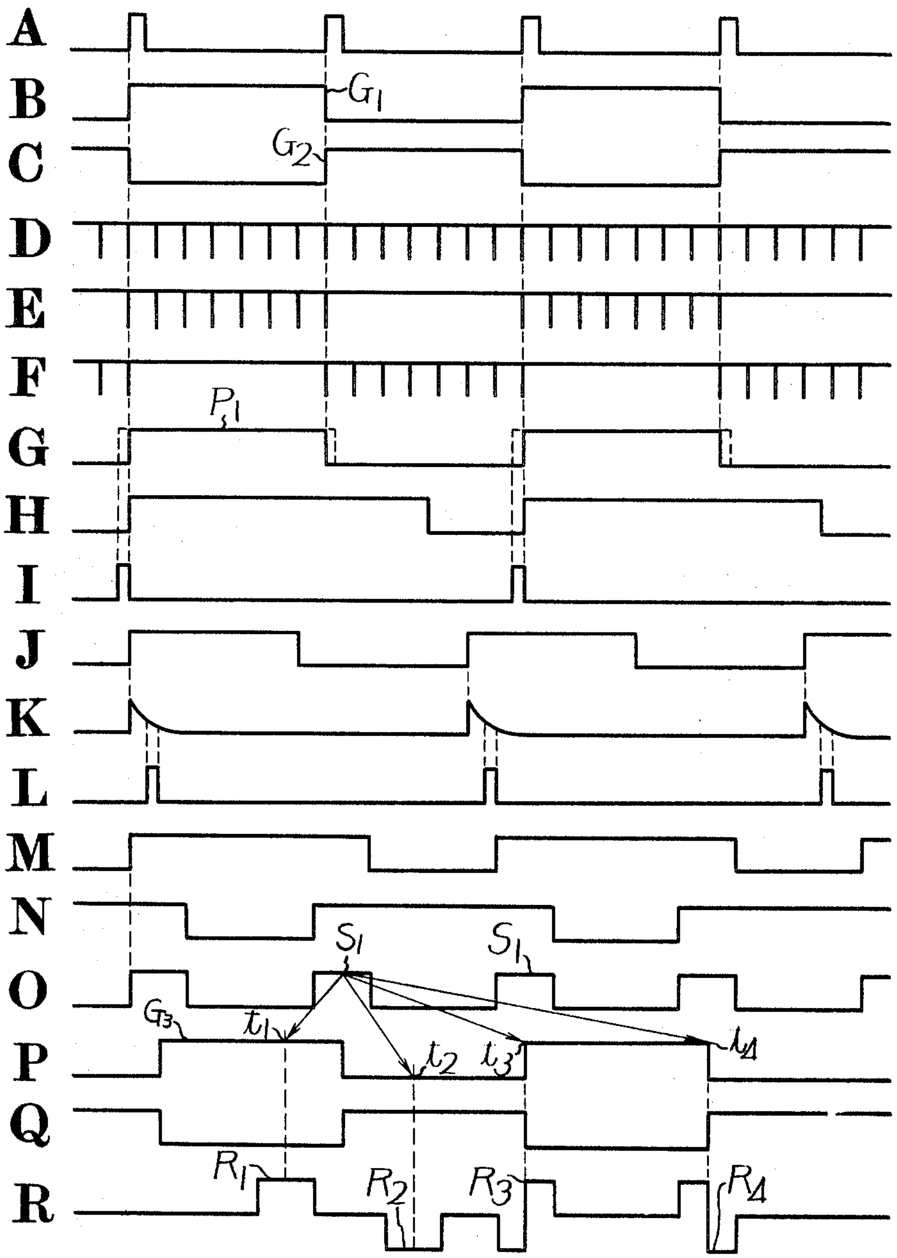
FIG. 3 is a diagram of various waveforms for explaining the operation of embodiments of the invention.

In the present example, since one field of the video signal is to be recorded in six tracks on the tape, the two rotary magnetic heads 5*a* and 5*b* are driven at a rotational speed three times as high as the field frequency, that is, if the field frequency is 60 c/s, the heads are rotated at 180 revs. per sec. to provide traces of the tape at the rate of 360/sec. The recording of each track is carried out in synchronism with a horizontal synchronizing signal so that the switching of the signal from one of the magnetic heads 5*a* and 5*b* to the other by circuit 3 may be effected in a horizontal blanking period. To this end, a portion of the signal from the video signal source *Sg* is applied to a synchronizing signal separator circuit 12, the output of which is fed to first and second gate circuits 13*a* and 13*b*. A pulse generator 14, for example, in the form of diametrically opposed magnets mounted on the rotary shaft 6 and cooperating with a fixed magnetic head, produces a reference signal in relation to the rotational or angular position of the rotary magnetic heads. The pulse generator 14 produces a reference pulse, such as is shown by waveform A of FIG. 3, which is synchronized with the revolution of the rotary magnetic heads and the reference pulse is fed through an amplifier 15 to a flip-flop circuit 16 to provide gate signals $G_1$ and $G_2$, as depicted by waveforms B and C of FIG. 3, which are opposite in polarity. These gate signals are respectively applied to first and second gate circuits 13*a* and 13*b*, which are supplied with a horizontal synchronizing pulse waveform D on FIG. 3 from synchronizing signal separator circuit 12. Consequently, gate circuits 13*a* and 13*b* produce horizontal synchronizing pulses, as are shown at E and F on FIG. 3, in the "on" periods of the gate signals $G_1$ and $G_2$ respectively. A flip-flop circuit 17 is set by the synchronizing pulse output of gate circuit 13*a* and is reset by the output of gate circuit 13*b*. As a result of this, a switching signal $P_1$, as indicated at G on FIG. 3, is obtained which rises coincidentally with the first horizontal synchronizing pulse from the gate circuit 13*a* and decays concurrently with the first synchronizing pulse from the gate circuit 13*b*.

With the standard horizontal scanning rate of 15,750/sec. and the standard vertical scanning rate or field frequency of 60/sec., whole equal numbers of horizontal synchronizing signals cannot occur during each one-sixteenth of a field period, that is, during the recording in each of the six successive tracks to contain the signals for one field.

Figure 4:
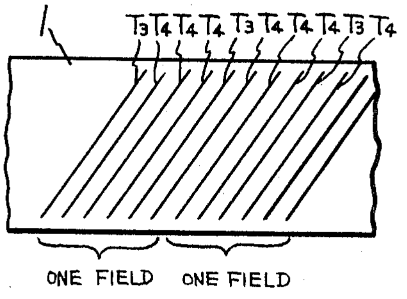
FIG. 4 is a fragmentary view of a length of magnetic tape showing magnetic tracks formed thereon.

The switching signal $P_1$ is applied to the switching circuit 3, by which the angle-modulated signal is switchingly applied alternately to the magnetic heads *5a* and *5b*. Accordingly, when the rising of the gate signal $G_1$ or $G_2$ substantially agrees with the first of the horizontal synchronizing pulses indicated at E or F, respectively, on FIG. 3, 44 horizontal synchronizing signals are included in the video signal recorded in the corresponding record signal track, and when the rising of the gate signal $G_1$ or $G_2$ is considerably spaced apart from the first of the group of horizontal synchronizing signals 43 horizontal synchronizing signals are included in video signal recorded in the corresponding record signal track. In short, one field is recorded in four video signal tracks $t_4$ each including 44 horizontal synchronizing signals and in two video signal tracks $t_3$ each including 43 horizontal synchronizing signals. Groups of six magnetic tracks are repeatedly recorded on the magnetic tape in sequence along the latter to contain the signals representing successive fields (FIG. 4).

In this case it is unknown in what order the six magnetic tracks of each field are recorded, that is, where the magnetic tracks including 43 horizontal synchronizing signals are recorded in each group of six magnetic tracks because of wow and flutter of the rotary magnetic heads. However, considering many magnetic tracks, there are recorded magnetic tracks on the tape which are not symmetrically located with respect to the longitudinal median of the tape, that is, are relatively near to one marginal portion, generally at the rate of 4 to 1.

During playback the record and playback switches *4a* and *4b* are engaged with their playback contacts P, so that the signals reproduced by the rotary magnetic heads *5a* and *5b* are respectively applied therethrough to playback amplifiers **18*a* and 18*b*. The amplified reproduced signals are angle-demodulated by a demodulator 19 and the demodulated output is fed to an output terminal 21 through an amplifier 20**.

A portion of the output of one of the playback amplifiers, for example, the amplifier **18*b*, is applied to an envelope detector 22 and its output, for example, the signal corresponding to the rising of the output of amplifier 18*b*** when a record signal track is first detected by head *5b*, is fed to a gate circuit 23 for phase-comparison use. Simultaneously, the reference pulse (indicated at A on FIG. 3) representative of the rotational angular position of the rotary magnetic heads is applied from pulse generator 14 through amplifier 15 to a monostable multivibrator 24, to thereby obtain a signal, as is shown at H on FIG. 3, whose duration is, for example, 1.5 times longer than the half cycle of the switching signal $P_1$. The signal indicated at H on FIG. 3 is applied as an inhibit gate signal to gate circuit 23, in which a phase comparison is effected between the inhibit gate signal and the output of envelope detector 22. Consequently, when the output signal of envelope detector 22 is produced prior to the inhibit gate signal as indicated by broken lines at H on FIG. 3, only the portion of the output signal lying on the left side of the inhibit gate signal appears in the form of an output from gate circuit 23, as indicated at I on FIG. 3. The envelope-detected output signal is of the same duration as the switching signal $P_1$ during recording and accordingly it corresponds to 44 horizontal synchronizing signals in the case of the playback of certain tracks and to 43 horizontal synchronizing signals in the case of other tracks, with the result that the width of the envelope-detected output signal varies as indicated by broken lines in H on FIG. 3. Further, the magnetic tapes have record signal tracks recorded thereon very close to one marginal portion of the magnetic tape at the rate of 4 to 1, as described above, and in each such case the envelope-detected signal is deviated furthest to the left from the inhibit gate signal depicted at H on FIG. 3 to provide a pulse at the output of gate circuit 23, that is, a difference signal such as shown at I on FIG. 3. This gate output signal is DC-amplified by an amplifier 25, and is employed to control the rotational speed of the rotary magnetic heads. In the embodiment shown, the output of amplifier 25 is applied to a damping device 26 mounted on the rotary shaft 6 to variably brake the rotation of such shaft in dependence on the output of circuit 23. When the output of the gate circuit 23 is zero, the damping device 26 is actuated to slow down the rotational speed of the rotary magnetic heads, that is to adjust the relative position of the tape, which may be driven at a constant speed, with respect to the heads *5a* and *5b* which are thus driven at an adjusted speed. Consequently, the inhibit gate signal shown at H on FIG. 3 shifts to the right in the drawing to cause the gate circuit 23 to produce an output, by which the braking or damping effect of damping device 26 is reduced to cause an increase in the rotational speed of the rotary magnetic heads, so that the inhibit gate signal H shifts to the left in the drawing to again reduce the output of the gate circuit 23 to zero. Thus, the signal representative of the mean position of the rising or onset of the reproduced output and the signal representative of the rotational or angular position of the rotary magnetic heads are always held in substantially a constant relationship, for ensuring that the rotary magnetic heads exactly trace the magnetic tracks.

With the magnetic recording and reproducing system of this invention, constant faithful scanning of the magnetic record signal tracks by the rotary magnetic heads can be achieved, without using separate control signals, by envelope-detection of the reproduced signal and by phase comparison of the resulting signal with the signal representative of the rotational or angular position of the rotary magnetic heads. Accordingly, the separate control signal track extending along a margin of the tape becomes unnecessary with the result that the utilization factor of the magnetic tape, that is, the area of the tape having record signal tracks thereon, may be increased. With a prior art system employing separate control signals, a magnetic tape of 12.5 mm. width has the skew magnetic tracks extending over 8.5 mm. of its width and the separate control signal track is 2 mm. wide. With this invention, however, the space for the control signal track and the space between the skew record signal tracks and the control signal track are rendered available for the formation of the skew record signal tracks to provide for increased utilization of the area of the tape to record signals that are to be reproduced. In addition, the recording and reproducing head and associated devices for the control signal become unnecessary, which leads to simplification of the entire construction of the magnetic recording and reproducing device. Further, a device according to this invention does not need the usual servosystem by means of which, during recording, the recording heads and the signal representative of their rotation position are always held in a predetermined relationship with respect to the control signals on the tape, and this also permits appreciable simplification of the construction of the device. During recording the angle-modulated signal from circuit 2 is switchingly applied through circuit 3 alternately to the magnetic heads *5a* and *5b* and at the time of application of such signal to each of the rotary magnetic heads such head has already completely engaged the magnetic tape so that, during playback, the rising of the envelope of the reproduced signal is sharp to provide accurate synchronization. It is apparent that the envelope-detected output of circuit 22 may correspond to the onset or rising of the signal from head *5b*, as shown, or to decay of such signal.

Figure 5:
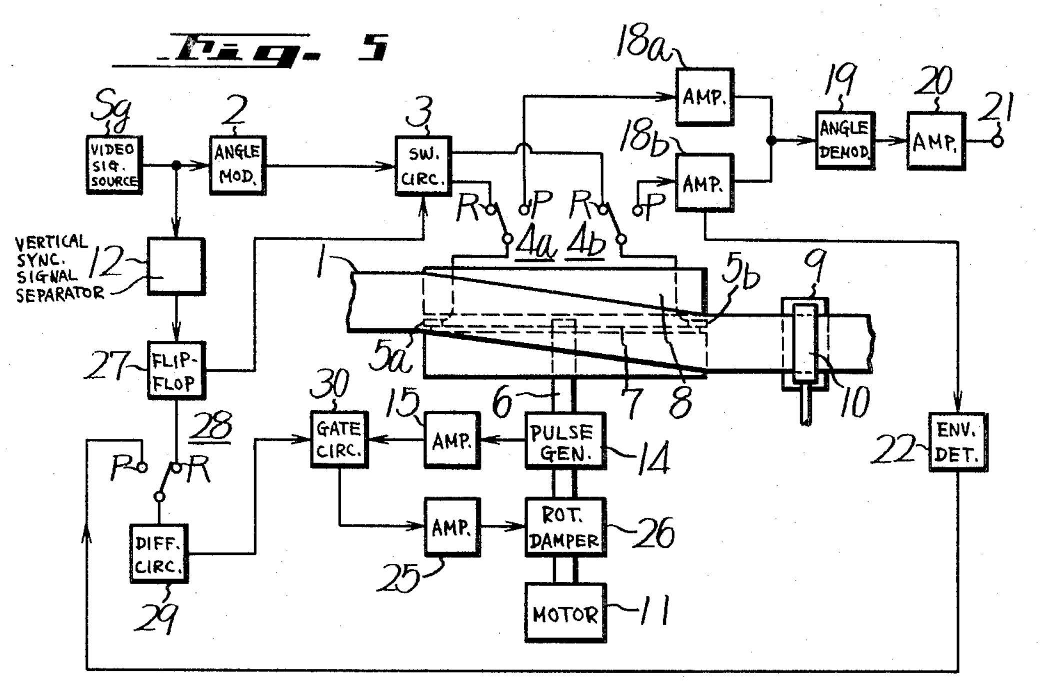
FIG. 5 is a block diagram of another example of the magnetic recording and reproducing system of this invention.

Although the present invention has been described above in connection with the case where each field of the video signal is recorded in six magnetic record signal tracks, it is also possible to record each field of the video signal in a single magnetic record signal track, as will hereinbelow be described with reference to FIG. 5. In FIG. 5, elements similar to those described with reference to FIG. 2 are identified by the same reference numerals and the description thereof will not be repeated. In the embodiment of FIG. 5, a vertical synchronizing signal is separated by a synchronizing signal separator circuit 12 and is applied to a flip-flop circuit 27 to provide a signal as shown at J on FIG. 3 and which is applied to a differentiation circuit 29 through a record contact R of a record and playback switch 28 so as to obtain from circuit 29 a positive differentiated signal, as depicted at K on FIG. 3. The differentiated signal is fed to a gate circuit 30. Simultaneously, the output of the pulse generator 14 representative of the rotational position of the rotary magnetic heads is applied through amplifier 15 to gate circuit 30 in the form of a reference signal or pulse such as illustrated at L on FIG. 3. In this embodiment, the rotary magnetic heads rotate once per frame, that is, at a speed of 30 rev. per sec., to provide traces on the tape at the rate of 60/sec. which is the field frequency, and the generator 14 provides a single pulse during each revolution of the heads, that is, at the frequency of 30/sec. With this reference signal the differentiated pulse depicted at K on FIG. 3 is sampled out in the gate circuit 30, and the output of the latter is applied to a damping device 26 through an amplifier 25. In this embodiment, when the output of gate circuit 30 exceeds a predetermined value the damping or braking force of damping device 26 increases to reduce the rotational speed of rotary magnetic heads **5*a* and 5*b*, so that the reference pulse depicted at L on FIG. 3 shifts to the right in the figure to cause a decrease in the output of the gate circuit 30. When the output of the gate circuit 30 is lower than the predetermined level, the damping or braking force of the damping device 26 decreases to increase the rotational speed of the rotary magnetic heads, with the result that the reference pulse shown at L on FIG. 3 shifts to the left. Consequently, the tendency is for the gate circuit 30 to produce an output of a constant level at all times and the pulse representative of the rotational position of the rotary magnetic heads becomes synchronized with the vertical synchronizing signal of the video signal. By changing over the switching circuit 3 with the output of the flip-flop circuit 27 to which the vertical synchronizing signal is supplied, that is, by employing the signal indicated at J on FIG. 3 for changing over the switching circuit 3**, the vertical synchronizing signal occurs at the beginning of each magnetic track, that is, the time of the changeover from one of the magnetic heads to the other corresponds to the vertical synchronizing signal, thus forming one magnetic track for each field of the video signal.

During playback, the output of one playback amplifier, for example, the amplifier **18*b*, is detected by envelope detector 22 and the detected output is fed to differentiation circuit 29 through the playback contact P of switch 28. In this case, the output of the envelope detector circuit 22** becomes the same as the switching signal depicted at J on FIG. 3 so that the rotational speed of the rotary magnetic heads is controlled in the same manner as the above-described control during recording for ensuring faithful scanning of the magnetic tracks by the rotary magnetic heads.

Figure 6:
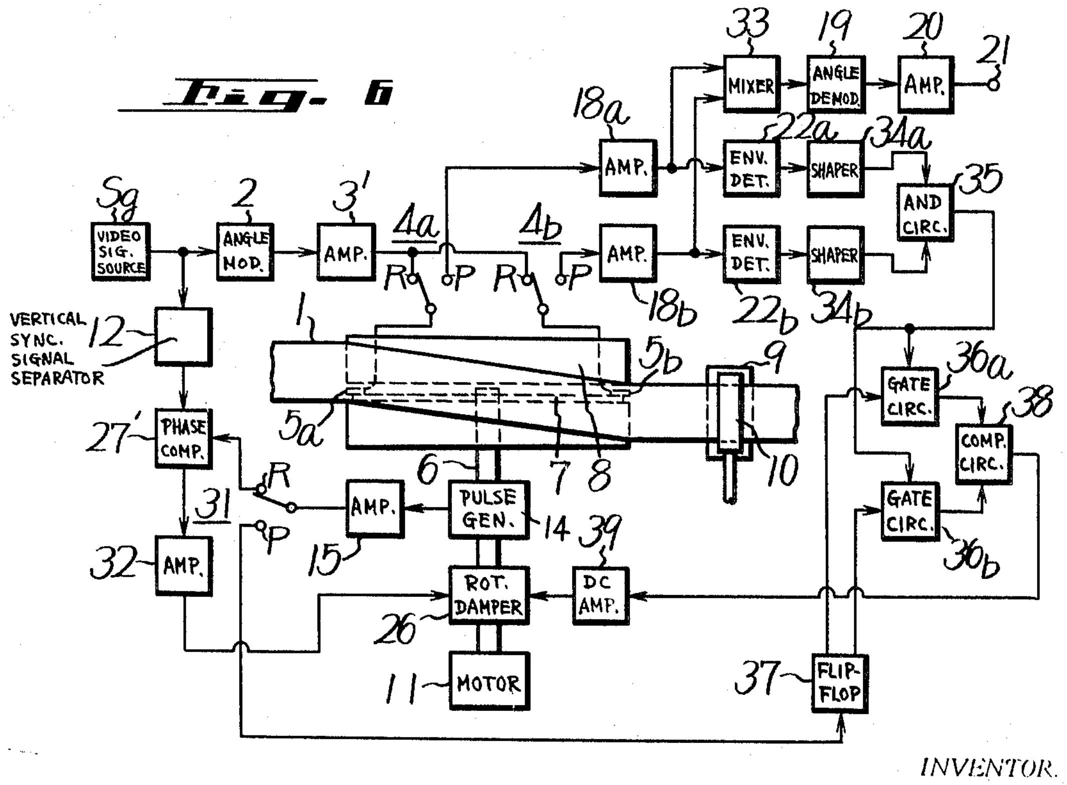
FIG. 6 is a block diagram of still another example of the magnetic recording and reproducing system of this invention.

Although in the foregoing description of the embodiment of FIG. 5, the video signal to be recorded is switchingly applied to the rotary magnetic heads during recording so that the signal corresponding to each field is recorded in a corresponding track on the tape, faithful scanning of the magnetic tracks by the rotary magnetic heads can also be achieved, without switching of the signal during recording, by simultaneously recording a portion of the signal for a field at the beginning of one magnetic track and at the end of the magnetic track immediately preceding it. For example, the portion of the signal which is simultaneously recorded in two successive tracks may be that having the vertical synchronizing signal included therein. In any case, the signals recorded in adjacent tracks have a partly overlapped portion, and such overlapping portion or the synchronizing signal is detected during playback and is compared with the rotational angular position of the magnetic heads. FIG. 6 illustrates an embodiment of the invention in which the switching circuit is omitted from the recording portion of the device. In such device the output of angle modulator 2 is simultaneously applied to rotary magnetic heads **5*a* and 5*b* through recording amplifier 3' and record and playback switches 4*a* and 4*b*. In this case, a vertical synchronizing signal separated by a synchronizing separator circuit 12 is fed to a phase comparator circuit 27', in which the vertical synchronizing signal is compared with the output of pulse generator 14 applied to the comparator circuit 27 through a record contact R of a record and playback switch 31. The output of comparator circuit 27 is fed to damping or braking device 26 through an amplifier 32, by which the rotational speed of rotary magnetic heads 5*a* and 5*b* is synchronized with the vertical synchronizing signal of the video signal in order that the rotary heads 5*a* and 5*b*** may each form one magnetic track for each field, that is, the frequency with which magnetic tracks are formed on the tape is equal to the field frequency.

During playback, the outputs of playback amplifiers **18*a* and 18*b* are respectively applied to envelope-detector circuits 22*a* and 22*b* and are also intermixed by a mixer 33 before being fed to the angle demodulator 19. The outputs of the envelope detectors 22*a* and 22*b* are applied to waveform shaper circuits 34*a* and 34*b*, producing signals as shown at M and N, respectively, on FIG. 3. These waveform-shaped signals are fed to an AND circuit 35, by which an output is obtained in the form of the signal $S_1$ shown at O on FIG. 3. This signal $S_1$ indicates periods during which signals are simultaneously reproduced by both rotary magnetic heads, namely the so-called overlap period. The signal $S_1$ is fed to gate circuits 36*a* and 36*b*. Simultaneously, the output of pulse generator 14 is fed to a flip-flop circuit 37 through a playback contact P of changeover or playback and record switch 31, and gate signals such as are shown at P and Q on FIG. 3 are obtained as the output of circuit 37. These gate signals are opposite in sense, and are respectively applied to the gate circuits 36*a* and 36*b*. The gate circuits 36*a* and 36*b* are arranged to have outputs of opposite polarity, for example, the output of the gate circuit 36*a* is positive and that of the other gate circuit 36*b* is negative. The outputs of these gate circuits 36*a* and 36*b* are combined together by a composite circuit 38 and DC-amplified by a DC amplifier 39 for application to damping or braking device 26. During playback or reproducing, when the middle point of the overlap signal $S_1$ agrees with a point $t_1$ of the "on" period of a gate signal $G_3$ depicted at P on FIG. 3, a gate output is obtained from the gate circuit 36*a* in the form of a positive signal $R_1$ as indicated at R on FIG. 3. When the middle point of the signal $S_1$ coincides with a point $t_2$ of the "off" period of the gate signal $G_3$, a negative signal $R_2$ is obtained from the gate circuit 36*b*. Further, when the middle point of signal $S_1$ agrees with the onset or rising point $T_3$, a positive pulse signal $R_3$ is obtained from gate circuit 36*a* following the negative pulse signal from gate circuit 36*b*, and when the middle of point of signal $S_1$ agrees with a decay point $t_4$ of the gate signal, a signal $R_4$ opposite in polarity to the signal $R_3$ is obtained from the composite circuit 38. Consequently, when the signal $R_1$ is produced, the damping force of damping device 26 is increased to thereby slow down the rotational speed of the rotary magnetic heads until the decay point $t_4$ and the middle point of the overlap signal $S_1$ come to agree with each other to reduce to zero the mean power from amplifier 39 to the damping device 26, at which point synchronization is obtained. When the middle point of signal $S_1$ coincides with the "off" period of gate signal $G_3$ to provide a negative output $R_2$, the damping force of device 26 is decreased to cause increase in the rotational speed of the rotary magnetic heads until the middle point of signal $S_1$ comes to agree with the onset or rising point $t_3$ of a gate signal to obtain the signal $R_3$ and thereby again reduce the mean value of the gate output and the power to the damping device to zero, thus rendering steady the rotational speed of the rotary magnetic heads. Thus, the middle point of the overlap signal and the rotation of the rotary magnetic heads are always held in a constant relationship, in which the rotary magnetic heads always faithfully follow the magnetic tracks. In the embodiment of FIG. 6, the outputs of the playback amplifiers 18*a* and 18*b* may be switchingly or alternately applied to the angle demodulator 19, rather than being intermixed by the mixer 33**, as shown.

In the foregoing it is preferred that the slit gaps of the rotary magnetic heads lie substantially at right angles to the direction in which the magnetic tracks are formed. This increases control sensitivity more than the case in which the slit gaps are parallel to the lengthwise direction of the magnetic tape. Although the described embodiments of the invention control the rotational speed of the rotary magnetic heads in accordance with the output obtained by comparison of the signal representative of the rotational or angular position of the magnetic heads with the envelope detected signal for ensuring that the heads accurately scan or follow the magnetic tracks, the same result can be similarly achieved by controlling the speed of movement of the tape. Control of both the rotational speed of the heads and the speed of movement of the tape can also be effected, and such control may be achieved by direct control of the motor itself rather than through the use of the damping device. Although the present invention has been described in connection with systems employing two rotary magnetic heads, this invention is also applicable to systems using one rotary head or more than two rotary magnetic heads.

It will be apparent that the above and many other modifications and variations of the described embodiments may be effected without departing from the scope or spirit of this invention as defined in the appended claims.

What I claim is:

1. In a magnetic recording and reproducing system in which rotary magnetic recording and reproducing head means records signals on a transported magnetic tape in successive tracks that are skewed relative to the lengthwise direction of the tape; means for aligning the traces of said magnetic head means with said tracks in which the signals are recorded during reproducing of said signals comprising means for producing a reference signal in accordance with the rotational position of said rotary magnetic head means, means operative during reproducing of signals for envelope-detecting the signals reproduced by said head means and producing an envelope-detected output, means for effecting a phase comparison of said envelope-detected output with said reference signal, and means responsive to said phase comparison for adjusting the relative positioning of said tape and said head means so as to maintain alignment of said traces of said head means with said tracks.

2. A magnetic recording and reproducing system according to claim 1, in which said means for adjusting the relative positioning of said tape and head means is operative to control the rotational speed of said head means.

3. A magnetic recording and reproducing system according to claim 1, in which said envelope-detected output corresponds to the rising portions of said reproduced signals.

4. A magnetic recording and reproducing system according to claim 1, in which said envelope-detected output corresponds to the decay portions of said reproduced signals.

5. A magnetic recording and reproducing system according to claim 1, in which said envelope-detected output corresponds to intermediate portions of said reproduced signals.

6. In a magnetic recording and reproducing system in which rotary magnetic recording and reproducing head means records signals on a transported magnetic tape in successive tracks that are skewed relative to the lengthwise direction of the tape, and in which said signals recorded in said tracks are video signals including synchronizing signals and said head means includes two diametrically opposed magnetic heads alternately tracing across said tape in said skewed tracks during the recording of said signals therein; means for aligning the traces of said magnetic head means with said tracks in which the signals are recorded during reproducing of said signals comprising means for producing a reference signal in accordance with the rotational position of said rotary magnetic head means, means for envelope-detecting the signals reproduced by said head means and producing an envelope-detected output, means for effecting a phase comparison of said envelope-detected output with said reference signal, means responsive to said phase comparison for adjusting the relative positioning of said tape and said head means so as to maintain alignment of said traces of said head means with said tracks, and means operable by said synchronizing signals and said reference signal during recording of said video signals in said successive tracks to switch said video signals to said two heads alternately.

7. A magnetic recording and reproducing system according to claim 6, in which each field of said video signals is to be recorded in a group of said successive skewed tracks, and said means to switch said video signals to said two heads alternately includes means to separate horizontal synchronizing signals from said video signals, and switching means operable upon the horizontal synchronizing signal which immediately follows said reference signal indicating the positioning of each of said heads at the start of a skewed track so that each switching of said video signals from one of said heads to the other occurs during a horizontal blanking period.

8. A magnetic recording and reproducing system according to claim 6, in which said synchronizing signals are vertical synchronizing signals so as to record each field of said video signals in an individual one of said skewed tracks.

9. A magnetic recording and reproducing system according to claim 8, in which said means for effecting the phase comparison of said envelope-detected output with said reference signal includes differentiating circuit means producing a positive differentiated signal in response to said envelope-detected output, and gate circuit means receiving said differentiated signal and being made to sample out the latter in response to said reference signal so that the output of said gate circuit means is determined by said phase comparison, and in which said means for adjusting the relative positioning of said tape and head means is controlled by said output of the gate circuit means.

10. In a magnetic recording and reproducing system in which rotary magnetic recording and reproducing head means records signals on a transported magnetic tape in successive tracks that are skewed relative to the lengthwise direction of the tape, and in which said head means includes two recording and reproducing magnetic heads to which said signals to be recorded are simultaneously applied for recording of the same signals in portions of adjacent skewed tracks; means for aligning the traces of said magnetic head means with said tracks in which the signals are recorded during reproducing of said signals comprising means for producing a reference signal in accordance with the rotational position of said rotary magnetic head means, means for envelope-detecting the signals reproduced by said head means and producing an envelope-detected output, means for effecting a phase comparison of said envelope-detected output with said reference signal, means responsive to said phase comparison for adjusting the relative positioning of said tape and said head means so as to maintain alignment of said traces of said head means with said tracks, during reproducing of the recorded signals, said envelope-detecting means individually envelope-detecting the signals from said two heads, said means for effecting said phase comparison including means receiving the envelope-detected outputs of both heads and producing an overlap signal indicating the periods during which signals are simultaneously reproduced by both heads, and means comparing said overlap signal with said reference signal.